(12) United States Patent
Felch et al.

(10) Patent No.: US 10,654,737 B2
(45) Date of Patent: May 19, 2020

(54) SYSTEMS AND PROCESSES FOR TREATMENT OF HIGH TOTAL DISSOLVED SOLIDS WASTEWATER

(71) Applicant: Siemens Energy, Inc., Orlando, FL (US)

(72) Inventors: Chad L. Felch, Kronenwetter, WI (US); Bryan J. Kumfer, Ringle, WI (US); Eric Martin, Tomahawk, WI (US)

(73) Assignee: SIEMENS ENERGY, INC., Orlando, FL (US)

(*) Notice: Subject to any disclaimer, the term of this patent is extended or adjusted under 35 U.S.C. 154(b) by 0 days.

(21) Appl. No.: 16/313,235

(22) PCT Filed: Aug. 24, 2017

(86) PCT No.: PCT/US2017/048402
§ 371 (c)(1),
(2) Date: Dec. 26, 2018

(87) PCT Pub. No.: WO2018/044679
PCT Pub. Date: Mar. 8, 2018

(65) Prior Publication Data
US 2019/0161372 A1 May 30, 2019

Related U.S. Application Data

(60) Provisional application No. 62/381,890, filed on Aug. 31, 2016.

(51) Int. Cl.
*C02F 11/08* (2006.01)
*C02F 1/74* (2006.01)
(Continued)

(52) U.S. Cl.
CPC .......... *C02F 11/08* (2013.01); *C02F 1/26* (2013.01); *C02F 1/441* (2013.01); *C02F 1/74* (2013.01); *C02F 1/78* (2013.01); *C02F 3/1268* (2013.01); *C02F 3/02* (2013.01); *C02F 2003/003* (2013.01); *C02F 2101/101* (2013.01); *C02F 2101/32* (2013.01); *C02F 2101/40* (2013.01); *C02F 2103/365* (2013.01);
(Continued)

(58) Field of Classification Search
CPC .... C02F 11/08; C02F 1/26; C02F 1/78; C02F 3/02; C02F 2209/08; C02F 2303/16; C02F 2003/003; C02F 2101/101; C02F 2101/32; C02F 2101/40; C02F 2103/365; C02F 1/441; C02F 1/74; C02F 3/1268; Y02W 10/15
USPC ..................................................... 210/631, 761
See application file for complete search history.

(56) References Cited

U.S. PATENT DOCUMENTS 3,977,966 A 8/1976 Pradt et al.
2007/0209999 A1 9/2007 Smith et al.
(Continued)

OTHER PUBLICATIONS

PCT International Search Report and Written Opinion of International Searching Authority dated Oct. 24, 2017 corresponding to PCT International Application No. PCT/US2017/048402 filed Aug. 24, 2017.

*Primary Examiner* — Fred Prince (57) ABSTRACT

There are provided systems and processes which enable the efficient biological treatment of high salt concentration fluid streams, e.g., spent caustics, to reduce COD concentrations in the fluid streams.

20 Claims, 2 Drawing Sheets

(51) Int. Cl.
*C02F 3/12* (2006.01)
*C02F 1/44* (2006.01)
*C02F 1/26* (2006.01)
*C02F 1/78* (2006.01)
*C02F 3/02* (2006.01)
*C02F 101/32* (2006.01)
*C02F 103/36* (2006.01)
*C02F 101/10* (2006.01)
*C02F 3/00* (2006.01)

(52) U.S. Cl.
CPC ...... *C02F 2209/08* (2013.01); *C02F 2303/16* (2013.01); *Y02W 10/15* (2015.05)

(56) References Cited

U.S. PATENT DOCUMENTS

| | | |
|---|---|---|
| 2014/0061134 A1 | 3/2014 | Felch et al. |
| 2015/0021264 A1 | 1/2015 | Tsuda et al. |
| 2015/0284264 A1 | 10/2015 | Kumfer et al. |
| 2015/0353397 A1* | 12/2015 | Cath ................. C02F 3/308 210/195.1 |

* cited by examiner

SYSTEMS AND PROCESSES FOR TREATMENT OF HIGH TOTAL DISSOLVED SOLIDS WASTEWATER

CROSS REFERENCE TO RELATED APPLICATIONS

This application is a National Stage application of PCT/US2017/048402, filed Aug. 24, 2017, which claimed priority to and the benefit of the filing date of U.S. Provisional Application No. 62/381,890, filed Aug. 31, 2016. The entirety of each application is hereby incorporated by reference.

FIELD

This invention relates to treatment systems and processes for treating waste streams, and in particular to systems and processes which enable the efficient biological treatment of high total dissolved solids (TDS) concentration fluid streams, e.g., spent caustics, to reduce chemical on demand (COD) concentrations in the fluid streams.

BACKGROUND

In industries such as petroleum refining and ethylene production, aqueous caustic washing is sometimes employed to improve the quality of the product and/or aid in the refining process. The caustic washings are done to remove, for example, sulfidic and/or acidic components from the relevant hydrocarbon streams. Aqueous spent caustic streams from these treatments may contain high chemical oxygen demand (COD) and other contaminants, such as sulfides, mercaptans, naphthenates, cresylates, and emulsified hydrocarbons, for example. The aqueous spent caustics often have high pH concentrations, for example, pH concentrations of about 13 or above. Environmental and safety considerations require treatment of spent caustics before discharge to the environment.

To reduce COD concentrations in the spent caustic, biological treatment of the wastewater is widely practiced. The wastewater is commonly treated with activated sludge such that dissolved and suspended organics, for example, are acted upon by bacteria during a sludge residence time within a bioreactor (e.g., an aerated treatment tank). The odorous and reactive nature of spent caustic, however, often precludes the use of biological treatment alone as the sole method of treatment—even with dilution of the spent caustic. For this reason, another treatment, e.g., wet air oxidation, is utilized in combination with (e.g., upstream of) biological treatment for the treatment of spent caustic.

Wet air oxidation (WAO) is a well-known technology for treating process streams, and is widely used, for example, to destroy oxidizable contaminants in wastewater, such as the aforementioned spent caustic streams. The process involves aqueous phase oxidation of undesirable constituents by an oxidizing agent, generally molecular oxygen from an oxygen-containing gas, at elevated temperatures and pressures. By way of example, the process may convert organic contaminants to carbon dioxide, water, and biodegradable short chain organic acids, such as acetic acid. Inorganic constituents, including sulfides, mercaptides, and cyanides, can also be oxidized. In the context of spent caustic, WAO detoxifies the spent caustic by oxidizing sulfides and mercaptans to sulfate and breaking down toxic naphthenics and cresylics.

One issue with the biological treatment of spent caustic streams, however, is that total dissolved solids (TDS) concentrations in the spent caustic are typically incompatible with biological treatment—even after wet air oxidation. The TDS mainly include salts, and also may include dissolvable organics. If the TDS/salt concentration is too high, the spent caustic may cause a decrease in biological treatment efficiency, which could result in high effluent concentrations of soluble COD and soluble nitrogen, and decreased biological solids settling. In addition, the TDS/salt concentration may cause significant osmotic pressure increases in the bioreactor, which could further result in shutdown of the bioreactor. For these reasons, the spent caustic stream is often added to a very large biological treatment system which results in significant dilution of the spent caustic. The dilution fluid utilized, however, significantly adds materials, costs, handling, and volume to the overall system.

Moreover, if the spent caustic is desired to be reused (after treatment) for purposes such as boiler feed water or the like, salts will need to be removed therefrom. A common salt removal method is reverse osmosis. However, significant dilution of the caustic stream to allow for biological treatment and reverse osmosis also significantly increases the volume of the stream, and thus thereby significantly increases the size of the associated reverse osmosis unit(s) required and volume of fluid to be processed. Reverse osmosis also generally requires a pretreatment step, which would also increase the system footprint relative to a system which treats the spent caustic stream without dilution.

SUMMARY

In accordance with an aspect of the present invention, the present inventors have developed systems and processes that enable wet air oxidation and biological treatment of high salt concentration wastewater, e.g., spent caustic, while significantly reducing footprint, material costs, and operational costs. In certain embodiments, the biological treatment may be done with dilution of the wastewater introduced into the bioreactor, but the dilution fluid utilized is primarily or completely generated internally. In other embodiments, the wet air oxidation and the biological treatment of the high salt concentration wastewater can be accomplished without dilution of the wastewater at all as set forth herein. In either case, the processes and systems described herein allow for the treatment of wastewater, e.g., spent caustic, streams separate from other streams in a treatment facility. In this way, issues that could arise from the combination of spent caustic, for example, with other streams (e.g., odor issues, foaming, toxicity) are reduced or eliminated.

More particularly, in accordance with one aspect of the present invention, the inventors have developed systems and processes which utilize a dilution fluid generated in situ to dilute a wastewater, e.g., spent caustic, prior to biological treatment to allow for effective biological treatment of the wastewater. For example, the dilution is done without adding or significantly adding water to the associated system and process, and allows for the recycling of water (already in the system) to provide a needed dilution fluid prior to biological treatment. In other words, once operation is initiated, the systems and processes do not need repeated additions of dilution fluid to achieve discharge requirements that generally require biological treatment. In another aspect, the processes and systems described herein allow for effective COD and contaminant reduction from a spent caustic stream while also providing a concentrated treated caustic stream for discharge.

In accordance with another aspect of the present invention, the present inventors have developed further systems and processes to enable biological treatment of high salt concentration wastewater without dilution of the starting stream. In an embodiment, this is done by first subjecting the high salt concentration wastewater to a wet air oxidation process to reduce a first amount of COD from the wastewater, and thereafter contacting a high salt concentration effluent from wet air oxidation (first treated stream) with a mixture of a biomass and powdered activated carbon in a bioreactor under conditions effective to further reduce a second amount of COD from the wastewater, wherein the powdered activated carbon is believed to provide a substrate for attached growth biological treatment of the wastewater (e.g., spent carbon).

In accordance with an aspect of the present invention, there is provided a treatment process for wastewater comprising a chemical oxygen demand (COD) concentration and a total dissolved solids (TDS) concentration of at least about 10 g/L therein, the process comprising:

a) subjecting the wastewater to wet air oxidation to remove an amount of COD from the wastewater and generate a first treated stream comprising a first reduced COD concentration and the TDS concentration of at least about 10 g/L;

(b) subjecting the first treated stream to a biological process in a bioreactor comprising an amount of biomass and powdered activated carbon therein, wherein the biological process generates a second treated stream comprising at least a second reduced COD concentration.

In accordance with another aspect, there is provided another treatment system comprising:

(a) a source of wastewater comprising a chemical oxygen demand (COD) concentration and a total dissolved solids (TDS) concentration of at least about 10 g/L therein;

(b) a wet air oxidation unit in fluid communication with the source and configured to remove an amount of COD from the wastewater and generate a first treated stream comprising a first reduced COD concentration relative to the wastewater and the TDS concentration of at least about 10 g/L; and (c) a bioreactor downstream of and in fluid communication with the wet air oxidation unit, wherein the bioreactor comprises an amount of biomass and powdered activated carbon therein, and wherein the bioreactor is configured to remove further COD from the first treated stream and generate a second treated stream comprising at least a second reduced COD concentration relative to the first treated stream.

In accordance with another aspect, there is provided a treatment process for wastewater comprising a chemical oxygen demand (COD) concentration and a total dissolved solids (TDS) concentration therein, the process comprising:

(a) directing the wastewater to a wet oxidation unit for oxidation of oxidizable contaminants therein, thereby producing a first treated stream comprising a first reduced COD concentration and the TDS concentration;

(b) diluting the first treated stream with a dilution fluid generated from a brine concentration process, thereby producing a diluted first treated stream with a diluted TDS concentration; and (c) directing the diluted first treated stream to a biological treatment process, wherein the biological treatment process comprises contacting the source fluid with an amount of a biological material and an activated carbon material, and wherein the biological treatment process generates a second treated stream comprising a second reduced COD concentration with the diluted TDS concentration.

In accordance with another aspect, there is provided a treatment system for wastewater comprising contaminants and a salt concentration therein, the system comprising:

(a) a source of the wastewater;

(b) a wet air oxidation unit in fluid communication with the source;

(c) a bioreactor in fluid communication with the wet oxidation unit via a fluid line, the bioreactor comprising a biomass and powdered activated carbon therein; and (d) a brine concentrator in fluid communication with the bioreactor and the fluid line.

BRIEF DESCRIPTION OF THE DRAWINGS

The invention is explained in the following description in view of the drawings that show.

DETAILED DESCRIPTION

Figure 1:
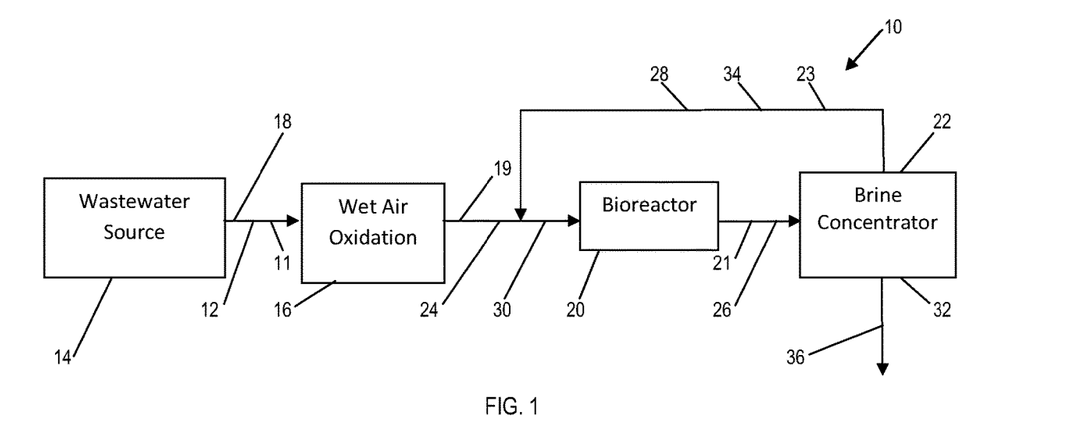
FIG. 1 is a schematic illustration of a system in accordance with an aspect of the present invention.

Now referring to the figures, FIG. 1 illustrates a first embodiment of a system in accordance with an aspect of the present invention. As shown, there is provided a treatment system 10 for treatment of a wastewater 11 (e.g., spent caustic 12) comprising at least a COD and a total dissolved solids (TDS) concentration therein. Hereinafter, the wastewater 11 may be referred to as "spent caustic 12" by way of example, however, it is understood that the present invention is not so limited to a spent caustic. It is appreciated that the wastewater 11 may further include any other aqueous fluid having a COD and TDS concentration. The system comprises a source 14 of the wastewater 11 (e.g., spent caustic 12), a wet air oxidation (WAO) unit 16 in fluid communication with the source 14 via a fluid line 18. In addition, the system 10 further comprises a bioreactor 20 in fluid communication with the WAO unit 16 via a fluid line 19, and a brine concentrator 22 in fluid communication with the bioreactor 20 (via a fluid line 21) and with the fluid line 19 (via fluid line 23).

In accordance with an aspect, the brine concentrator 22 is capable of producing a dilution fluid 28 which is used to dilute the wastewater 11 (following wet air oxidation) upstream from the bioreactor 20 such that the resulting diluted stream may be optimally and safely delivered to a biological treatment process in the bioreactor 20. In this way, dilution water is repeatedly recycled within the system 10. In addition, the recycling of dilution water eliminates the need for externally added dilution water in the biological treatment of a spent caustic having, for example, a high TDS concentration, e.g., > about 10 g/L. As used herein, the term "about" refers to a value which is ±1% of the stated value.

The source 14 may comprise any suitable vessel or system which provides an amount of a wastewater 11 (e.g., spent caustic 12) therefrom having at least a COD concentration and a high TDS concentration therein. By "high TDS concentration," it is meant the wastewater 11 comprises at least 10 g/L TDS, and in particular embodiments from about 10-200 g/L TDS, and in further embodiments from about 100-200 g/L TDS. When the wastewater comprises a spent caustic, the spent caustic 12 may comprise a refinery spent caustic or a sulfidic spent caustic as each is known in the art. In an embodiment, the term "refinery spent caustic" refers to spent caustic generated in the operation of equipment and processes, such as those which may be found at a petroleum refinery. Refinery spent caustic typically have high levels of chemical oxygen demand (COD), in some cases between about 400,000 mg/L and 500,000 mg/L or more. Refinery spent caustic may also comprise naphthenic spent caustics or cresylic spent caustics.

Naphthenic spent caustics may be produced from the scrubbing of kerosene and jet fuels and may contain high concentrations of organic compounds consisting of naphthenic acids, and also may contain phenol compounds and reduced sulfur compounds. Naphthenic spent caustics may also contain high levels of chemical oxygen demand (COD), in some cases greater than 100,000 mg/L. Naphthenic spent caustics may also contain thiosulfates and naphthenic acids, which may be broken down in a wet air oxidation process at temperatures above about 220° C. to about 280° C. or higher. Cresylic spent caustics may be produced from the scrubbing of gasoline and may contain high concentrations of phenol compounds (cresylic acids) and may also contain reduced sulfur compounds.

In another embodiment, the spent caustic 12 may comprise a sulfidic spent caustic. Sulfidic spent caustics may be produced from the scrubbing of hydrocarbons and may contain high concentrations of reduced sulfur compounds, such as sulfides and mercaptans, as well as organic compounds. In a particular embodiment, the sulfidic spent caustic comprises an ethylene spent caustic. The term "ethylene spent caustic" refers to spent caustic generated in the operation of equipment and processes such as those which may be found at an ethylene production facility, such as caustic used in the scrubbing of ethylene. For example, ethylene spent caustic may come from the caustic scrubbing of cracked gas from an ethylene cracker. This liquor may be produced by a caustic scrubbing tower. Ethylene product gas may be contaminated with $H_2S(g)$ and $CO2(g)$, and those contaminants may be removed by absorption in a caustic scrubbing tower to produce $NaHS(aq)$ and $Na_2CO_3(aq)$. The sodium hydroxide may be consumed and the resulting wastewater (ethylene spent caustic) contaminated with the sulfides, carbonates, and a small fraction of organic compounds. Insoluble polymers resulting from the condensation of olefins during scrubbing may also be present. Further examples of spent caustic comprising compounds capable of being oxidized by wet oxidation as described herein are set forth in U.S. Pat. No. 9,630,867, the entirety of which is hereby incorporated by reference.

The total dissolved solids (TDS) concentration in the wastewater 11 (e.g., spent caustic 12) comprises any number of salt species, as well as dissolved organics in some instances. Exemplary salts in the wastewater 11 include, but are not limited to salts, e.g., alkali salts of sulfides, carbonates, mercaptides, disulfide oil, phenolates, cresolates, xylenolates and naphthenates, as well as any alkaline components added to the original caustic wash solution (e.g., sodium hydroxide). In certain embodiments, the wastewater 11 may comprise sodium sulfide, sodium bisulfide, and sodium hydroxide. In an aspect, the TDS concentration is one which would reduce the efficiency of or have a detrimental effect (e.g., lifetime) of the bioreactor 20. In certain aspects, the wastewater 11 has a TDS concentration equal to greater than 10 g/L. In a particular embodiment, the TDS concentration is from 100-200 g/L. In certain embodiments, the salt concentration comprises sodium hydroxide, and the range of sodium hydroxide in the wastewater 11 is from about 1 to about 20% by wt.

The WAO unit 16 comprises one or more dedicated reactor vessels in which oxidation of oxidizable components within the wastewater 11 (e.g., spent caustic 12) takes place at elevated temperature and pressure (relative to atmospheric conditions), and in the presence of oxygen. In an embodiment, the WAO process is carried out at a temperature of 150° C. to 320° C. (275° F. to 608° F.) at a pressure of 10 to 220 bar (150 to 3200 psi). Further, in an embodiment, the wastewater 11 may be mixed with an oxidant, e.g., a pressurized oxygen-containing gas supplied by a compressor. The oxidant may be added to the wastewater 11 prior to and/or after flow of the wastewater 11 through a heat exchanger (not shown). Within the WAO unit 16, the material therein is heated for a suitable time and under suitable conditions effective to oxidize components in the wastewater 11 and produce a first treated stream 24 comprising a first reduced COD concentration (relative to the wastewater 11) and a TDS concentration. A gaseous portion (offgas) may also be produced having an oxygen content.

The bioreactor 20 may comprise one or more suitable vessels, each containing an amount of a biomass population suitable for further treating a quantity of compounds/contaminants from the material within the bioreactor 20. In the embodiment of FIG. 1, prior to delivery of the first treated stream 24 to the bioreactor 20, the first treated stream 24 is diluted with a dilution fluid 28 to produce a diluted stream 30. The diluted stream 30 is then delivered to the bioreactor 20. In an embodiment, the contaminants treated within the bioreactor 20 include carbon-containing compounds remaining from wet air oxidation, as well as any other compounds capable of being reduced or destroyed by biological treatment. In an embodiment, the bioreactor 20 comprises one or more treatment zones. As used herein, the phrase "treatment zone" is used to denote an individual treatment region. Individual treatment regions may be housed in a single vessel with one or more compartments. Alternatively, individual treatment regions may be housed in separate vessels, wherein a different treatment is carried out in separate vessels. The treatment zone, e.g., the vessel, tank, or compartment, may be sized and shaped according to a desired application and volume of material to be treated to provide a desired retention time.

The biomass population may include any suitable population of bacterial micro-organisms effective to digest biodegradable material, including one that does so with reduced solids production. Exemplary wastewater treatment with reduced solids production are described in U.S. Pat. Nos. 6,660,163; 5,824,222; 5,658,458; and 5,636,755, each of which are incorporated by reference herein in their entireties. The bacteria may comprise any bacteria or combination of bacteria suitable to thrive in anoxic and/or aerobic conditions. Representative aerobic genera include the bacteria *Acinetobacter, Pseudomonas, Zoogloea, Achromobacter, Flavobacterium, Norcardia, Bdellovibrio, Mycobacterium, Shpaerotilus, Baggiatoa, Thiothrix, Lecicothrix*, and *Geotrichum*, the nitrifying bacteria *Nitrosomonas*, and *Nitrobacter*, and the protozoa *Ciliata, Vorticella, Opercularia*, and *Epistylis*. Representative anoxic genera include the denitrifying bacteria *Achromobacter, Aerobacter, Alcaligenes, Bacillus, Brevibacterium, Flavobacterium, Lactobacillus, Micrococcus, Proteus, Pserudomonas*, and *Spirillum*. Exemplary anaerobic organisms include *Clostridium* spp., *Peptococcus anaerobus, Bifidobacterium* spp., *Desulfovibrio* spp.,

*Corynebacterium* spp., *Lactobacillus, Actinomyces, Staphylococcus* and *Escherichia coli*.

In certain embodiments, the bioreactor 20 may further include an amount of an activated carbon material therein. It is believed that the presence of the activated carbon may also help adsorb compounds potentially toxic to the biomass, thereby protecting the biomass. When present, the activated carbon may be provided in an amount effective to adsorb or otherwise remove an amount of an organic material from the diluted stream 30. In a particular embodiment, the activated carbon comprises powdered activated carbon. In certain aspects, the activated carbon may be effective to remove an amount of recalcitrant organics in the fluid (diluted stream 30) delivered to the bioreactor 20. As used herein, recalcitrant organics define a class of organics which may be slow or difficult to biodegrade relative to the bulk of organics in the diluted stream 30. By way of example, recalcitrant organics include synthetic organic chemicals. Other recalcitrant organics include polychlorinated biphenyls, polycyclic aromatic hydrocarbons, polychlorinated dibenzo-p-dioxin, and polychlorinated dibenzofurans. Endocrine disrupting compounds are also a class of recalcitrant organics which can affect hormone systems in organisms, and are found in the environment.

In an embodiment, the activated carbon may be added to the bioreactor 20 and allowed to contact the diluted stream 30 for a time sufficient to adsorb materials from the diluted stream 30. It is understood that the activated carbon may be introduced into the system 10 at any location within the system 10 so long as the activated carbon is present in the bioreactor 20. Typically, the activated carbon is added directly to the bioreactor 20. Alternatively, the activated carbon may be added upstream of the bioreactor 20.

In addition to activated carbon, in certain embodiments, the bioreactor 20 may comprise a membrane bioreactor as is known in the art which includes one or more porous or semi-permeable membranes therein for reducing an amount of TDS from the diluted stream 30. In some embodiments, the membranes are disposed within a housing in the bioreactor 20. In other embodiments, the membranes are disposed in a distinct housing from the bioreactor 20, which may be referred to as a "membrane unit." In an embodiment, the one or more membranes (hereinafter "membrane" for ease of reference) may comprise a microfiltration or an ultrafiltration membrane as are known in the art. In addition, the membrane may have any configuration suitable for its intended application, such as a sheet or hollow fibers.

Further, the membrane may be formed of any suitable material having a desired porosity and/or permeability for its intended application. In an embodiment, the membrane may be formed of polymeric hollow fibers. In other embodiments, the membrane may comprise a ceramic material, such as a ceramic flat sheet. Further, the membrane may have any suitable shape and cross sectional area such as, for example, a square, rectangular, or cylindrical shape. In one embodiment, the membrane has a rectangular shape. Further, in an embodiment, the one or more membranes may be positioned, e.g., vertically, in such a way as to be completely submerged by the treated stream, biological material, and activated carbon (if present).

When provided, the bioreactor 20 or discrete membrane unit may include a blower associated therewith for supplying a fluid, e.g., gas, to scour the membrane(s) and prevent solids build up on a surface of the membrane(s) therein. In an embodiment, an additional blower (if necessary) may be provided in order to supply an oxygen-containing gas for the biomass in the bioreactor 20. Each blower may produce fine bubbles, coarse bubbles, a jet stream of gas, a jet of gas and fluid, and combinations thereof. The gas may comprise nitrogen, air, fuel gas, or any other suitable gas. In addition, the blower may provide gas along a length of one or more membranes. Typically also, a pump may be provided to generate a suitable suction force to draw the desired material through each membrane.

From the bioreactor 20 or membrane unit(s) (when present), a second treated stream 26 having a further reduced COD content (relative to first treated stream 24) may be delivered to the brine concentrator 22. As will be explained in detail below, when a brine concentrator 22 is present, the purpose of the brine concentrator 22 is to produce a dilution fluid 28, e.g., an aqueous stream having a relatively low salt concentration (e.g., less than 50 g/L TDS), which can be utilized to repeatedly dilute the first treated stream 24 from the WAO unit 16 and produce a diluted stream 30 (upon each dilution) prior to the delivery to the bioreactor 20. The diluted stream 30 is then delivered to the bioreactor 20 for treatment.

The brine concentrator 22 may comprise any suitable apparatus employing a process to remove TDS from a fluid and produce the dilution fluid 28 having a reduced TDS concentration relative to the fluid introduced to the brine concentrator 22. In an aspect, the brine concentrator 22 may be configured to carry out a suitable process—such as high pressure reverse osmosis, membrane filtration, evaporation, forward osmosis, and the like. It is appreciated that the technology selected and the operation thereof may be based upon the amount of dilution water that needs to be recycled and delivered to the first treated stream 24 for dilution thereof. In an embodiment, the brine concentrator 22 comprises a reverse osmosis unit as is known in the art which will produce a TDS concentrate and a permeate (which can be used to dilute the first treated stream 24).

The brine concentrator 22 may be positioned at various points in the system. The following description explains in detail the operation of two distinct systems having a different positioning of the brine concentrator 22 therein. It is understood that the present invention, however, is not limited to the disclosed embodiments. In the embodiments shown in FIGS. 1-2, the brine concentrator 22 provides a fluid (dilution fluid 30) which can be used to dilute the wastewater between its source 14 and the brine concentrator 22. In other embodiments, there are disclosed further systems and processes for treating wastewater without the need for dilution of the wastewater prior to biological treatment as will be explained below.

Referring again to FIG. 1, an amount of wastewater 11 (e.g., spent caustic 12) comprising a COD concentration and a TDS concentration (e.g., 10-200 g/L) is delivered from the wastewater source 14 to the WAO unit 16. In the WAO unit 16, the wastewater 11 is subjected to wet air oxidation so as to treat oxidizable contaminants therein and generate the first treated stream 24 comprising a first reduced COD concentration (relative the stream 12) and comprising the TDS concentration. The TDS concentration is typically not changed or is substantially unchanged (e.g., less than 10% reduced) by the wet air oxidation process. In an embodiment, when dilution is provided, the first treated material 24 is diluted with a dilution fluid 28 prior to delivery to the bioreactor 20 or within the bioreactor 20. In an embodiment, the first treated material 24 is mixed/combined with the dilution fluid 28 is delivered through fluid line 23 (which establishes a fluid path between WAO 16 and bioreactor 20). The resulting diluted stream 30 thus has a diluted TDS/salt concentration, thereby rendering the diluted stream 30 much more suitable for treatment in the bioreactor 20. In certain embodiment, the diluted stream 30 has a TDS concentration of less than about 50 g/L.

In this instance, the dilution fluid 28 is provided from the brine concentrator 22 such that no external dilution fluid source need be added, thereby reducing material, handling, and operating costs. In the embodiment shown, the brine concentrator 22 may comprise a reverse osmosis unit 32 as is known in the art, and the dilution fluid 28 may comprise a permeate 34 from the reverse osmosis unit 32. Alternatively, the dilution fluid 28 may comprise a fluid having a reduced TDS concentration as a result of a different process at the brine concentrator 22. In addition to the dilution fluid 34, the brine concentrator 22 will provide a TDS (salt) concentrate 36. In an embodiment, the TDS concentrate 36 may have a salt concentration of 50-200 g/L for example, which may be comparable to the original wastewater 11. The TDS concentrate 36 may be directed to any suitable location, such as a location for storage, transport, or further processing.

Figure 2:
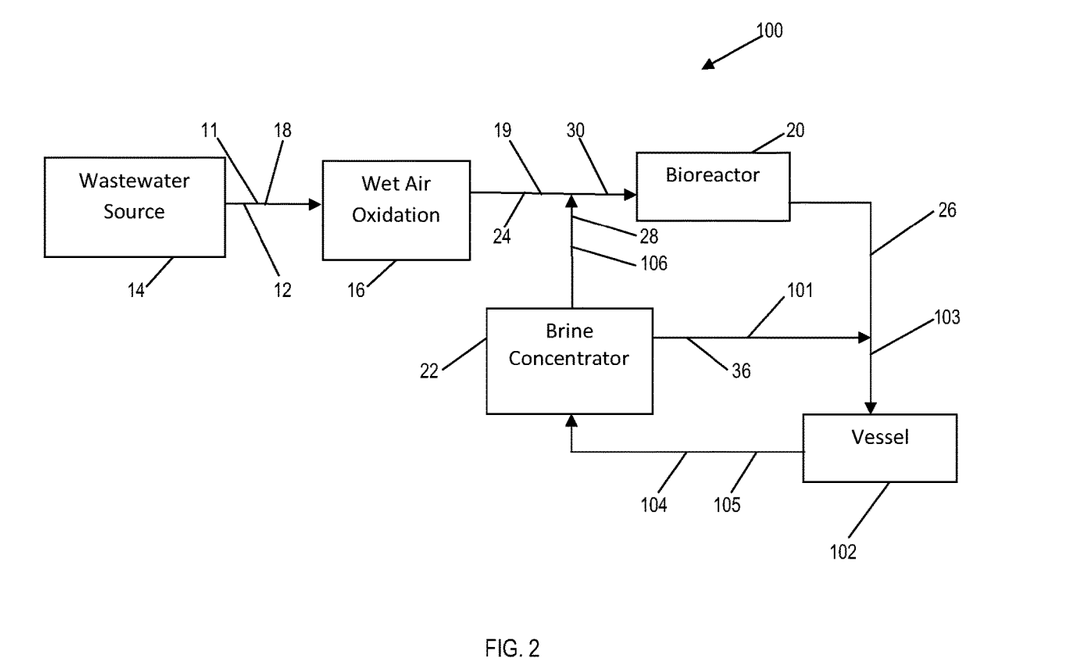
FIG. 2 is a schematic illustration of another system in accordance with an aspect of the present invention.

In an embodiment, the brine concentrator 22 receives a feed directly from the bioreactor 20. However, it is understood that the present invention is not so limited. In another embodiment as shown in FIG. 2, there shown another embodiment of a system 100 for treating a wastewater 11 (e.g., spent caustic 12). In this embodiment, the system 100 is instead configured such that a treated stream exits the bioreactor 20 and is combined with a TDS concentrate exiting the brine concentrator 22 to provide a combined reconcentrated stream—the combined steam is then delivered to an inlet of the brine concentrator 22. In this way, the process comprises reconcentrating the second treated stream 26 from the biological treatment at bioreactor 20 with an amount of the TDS concentrate 36 from the brine concentration process at brine concentrator 22. The process also further includes directing a reconcentrated (combined) stream to the brine concentration process at the brine concentrator 22 to reproduce the dilution fluid 28 and the salt concentrate 36.

To explain and as illustrated in FIG. 2, there is shown a system 100 having the same components as system 10 with additional components added therein. In the system 100, wastewater 11 (e.g., spent caustic 12) is delivered from a source 14 thereof to the WAO unit 16 via fluid line 18. From the WAO unit 16, a first treated stream 24 exits the WAO unit 16 and is directed towards the bioreactor 20 via fluid line 19. In this embodiment, however, the brine concentrator 22 does not directly receive a fluid from the bioreactor 20 yet still generates a dilution fluid 28 to be combined with the first treated stream 24. In an embodiment, the brine concentrator 22 comprises a reverse osmosis unit.

In operation, the brine concentrator 22 generates a dilution fluid 28 and a TDS concentrate 36 as described previously. In this embodiment, however, the brine concentrator 22 instead delivers the TDS concentrate 36 via fluid line 101 to be combined with the second treated stream 26 exiting the bioreactor 20. To accommodate both streams 26, 36, the system 100 further includes a vessel 102 within which the TDS concentrate 36 and the second treated stream 26 may be combined and optionally mixed together. The streams 26, 36 may be separately introduced into the vessel 102, or alternatively the concentrate 36 from line 101 may be combined with the second treated stream 26 in a fluid line 103 as shown (the fluid line 103 defining a flow path between the bioreactor 20 and the vessel 102). The resulting combined (reconcentrated) TDS (salt) stream 104 may be delivered from the vessel 102 back to the brine concentrator 22 via a fluid line 105 in order to again provide a dilution fluid 28 via fluid line 106 to dilute the first treated stream 24 before entering the bioreactor 20. The combined stream 104 has a TDS concentration of at least about 10 g/L, and in an embodiment from about 10-200 g/L, and in particular embodiments from about 100-200 g/L.

In accordance with another aspect, the present inventors have surprisingly found that dilution is not necessary if the wastewater 11 (e.g., spent caustic 12) is treated within a bioreactor that comprises an effective amount of both biomass and powdered activated carbon. As used herein, the term "effective amount" refers to an amount necessary to achieve an intended result. Without wishing to be bound by theory, it is believed that the powdered activated carbon particles themselves act as substrates on which biomass may be retained and grow, thereby providing for attached growth biological treatment. In addition, the powdered activated carbon itself may further assist in COD reduction (via adsorption or the like) by adsorption or the like, thereby removing target compounds from the material contacted therewith in contrast to artificial structures, such as discs and filters, typically employed in other "attached growth" systems for biological growth thereon which do not have such adsorption or removal properties of their own.

Figure 3:
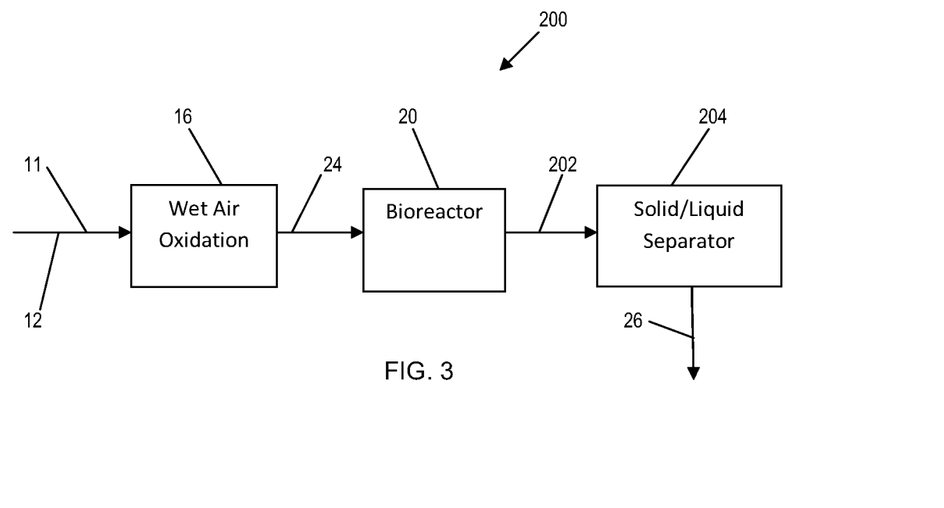
FIG. 3 is a schematic illustration of yet another system in accordance with an aspect of the present invention.

Referring to FIG. 3, there is shown an exemplary system 200 for treating a high salt concentration (e.g., 10-200 g/L TDS) wastewater 11 (e.g., spent caustic) without the need for dilution thereof. As shown, wastewater 11 is delivered from a source 14 thereof to the wet air oxidation (WAO) unit 16. As previously described herein, when the wastewater 11 comprises a spent caustic 12, the spent caustic 12 may comprise a refinery spent caustic, a sulfidic spent caustic, or a mixture thereof. The wastewater 11 comprises a COD concentration and a TDS (salt) concentration of at least 10 g/L, and in a particular embodiment, from about 10 g/L to about 200 g/L. Within the WAO unit 16, the wastewater 11 is subjected to a wet air oxidation process under time, temperature, pressure, and oxygen-rich conditions effective to generate a first treated stream 24 having a reduced COD concentration (relative to wastewater 11) and the same or substantially the same TDS concentration as the wastewater 11. In certain embodiments, at least 90% by weight of the TDS concentration is carried from the wastewater 11 to the first treated stream 24 (following wet air oxidation).

In the embodiment of FIG. 3, the WAO-treated spent caustic (first treated stream 24) may be delivered from the wet air oxidation unit 16 directly to the bioreactor 20 without dilution of the stream 24. To accomplish this, the bioreactor 20 comprises an amount of biomass and an amount of powdered activated carbon therein effective to further reduce an amount of COD in the first treated stream 24 and produce a second treated stream 26 having a COD concentration below a predetermined level. In an embodiment, the predetermined level is about 50 mg/L. The biomass and powdered activated carbon can be provided in any suitable ratio within the bioreactor 20 effective to reduce a desired amount of COD therein. In an embodiment, a weight ratio of the powdered activated carbon to biomass in the bioreactor 20 is from about 1:1 to about 5:1, and in a particular embodiment is from about 3:1 to about 5:1. To reiterate, the combination of biomass and powdered activated carbon is believed to allow for attached growth biological treatment of the WAO-treated spent caustic (stream 24)—even with its high salt concentration. In this way, the system 200 eliminates the need for dilution of a WAO-treated spent caustic 24, and further allows for treatment of a wastewater 11 (e.g., spent caustic 12) in isolation (without combining with other aqueous streams) which saves equipment costs, material expense, space, and operational expenses, and which prevents likely odor, toxicity, and foaming issues as described above.

The second treated stream 26 having the further reduced COD concentration can separated from the biomass/activated carbon, and can be recovered from the bioreactor 20 by any suitable process and structure. In an embodiment, as shown in FIG. 3, an effluent 202 from the bioreactor 20 comprising the treated stream 26, powdered activated carbon, and biomass is delivered from the bioreactor 20 to a solid/liquid separator 204. The solid/liquid separator 204 is configured to separate the solid biomass/activated carbon from the liquid portion to provide the second treated stream 26. The solid/liquid separator 204 may comprise a membrane unit (e.g., a reverse osmosis unit), a hydrocyclone, a belt press, a centrifuge, a clarifier, combinations thereof, or any other suitable apparatus. In any case, the resulting second treated stream 26 may comprise a COD concentration which is less than a predetermined threshold value for disposal, discharge, delivery, or transport. In some embodiments, the threshold value is 50 mg/L. In an embodiment, the second treated stream 26 still has the high TDS (including salt) concentration from the original wastewater 11. In an embodiment, the second treated stream 26 comprises a TDS concentration of from about 10-200 mg/L—comparable to the original wastewater 11.

In some embodiments, it may be desirable to reduce the TDS from the second treated stream 26 prior to reuse, disposal, discharge, transport, or storage of the second treated stream 26. In an embodiment, for example, the solid/liquid separator 204 may comprise a membrane unit comprising a plurality of membranes within a housing as previously described herein which will retain the TDS (including salts) as a retentate and allow a permeate to flow through the membrane unit having a reduced TDS concentration. Alternatively, any other suitable device for removing TDS from a stream introduced thereto may be utilized. In certain embodiments, the solid/liquid separator 20 (e.g., membrane unit) may be a discrete unit from the bioreactor 20 as shown in FIG. 3.

Figure 4:
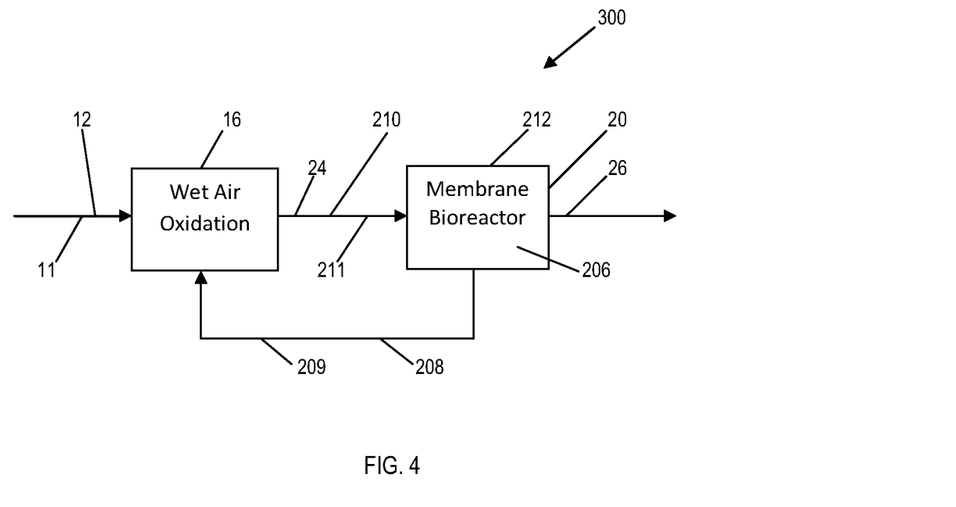
FIG. 4 is a schematic illustration of yet another system in accordance with an aspect of the present invention.

In other embodiments, the bioreactor 20 itself may be equipped with a solid/liquid separator 204 therein which enables TDS to be removed from the liquid in the bioreactor (first treated stream 24) and an effluent (second treated stream 26) to be generated having the reduced TDS concentration. In an embodiment, as shown in FIG. 4, there is shown a system 300 having the same components as system 200 except the bioreactor 20 comprises a membrane bioreactor 212. A wastewater 11, e.g., spent caustic 12, is subjected to wet air oxidation in the WAO unit 16 to provide the first treated stream 24, which is then delivered to the membrane bioreactor 212. In this case, the membrane bioreactor 212 may comprise an amount of biomass, powdered activated carbon, and one or more membranes 206 therein for separating solids/TDS from the liquid portion in the bioreactor and generating the second treated stream 26. In this case, the second treated stream 26 comprises a reduced COD concentration and also a reduced TDS concentration relative to the first treated stream 24. The membranes 206 may be of any suitable construction as described above. In some embodiments, the membranes 206 are housed in a distinct membrane housing (unit) within the bioreactor 20. The combination of biological treatment, activated carbon treatment, and membrane filtration in one unit is commercially available, for example in a PACT® MBR system from Siemens Energy, Inc. This compact system, for example, typically occupies 50 percent less space compared with the area required by conventional treatment systems using separate activated sludge, ultrafiltration, and activated carbon stages, and also significantly reduces equipment and operational costs.

In any of the embodiments described herein and as is shown in FIG. 4, it may be desirable to regenerate spent activated carbon from the bioreactor 20. In this case, an amount of spent carbon 208 may be delivered from an outlet of the bioreactor 20 back to the WAO unit 16 via line 209 for regeneration of the spent carbon material and oxidation of biological solids (when present) and oxidizable materials (e.g., organics) therein. By "spent," it is meant that an ability of the carbon material to remove further target components in the bioreactor 20 has at least decreased. In certain embodiments, the spent carbon is regenerated in the wet air oxidation unit 16 along with treatment of the wastewater 11 introduced thereto. Once regenerated to a desired degree, an effluent 210 comprising at least the spent carbon and optionally also the first treated stream 26 may be returned to the bioreactor 20 via line 211 for use/treatment therein.

In the systems and processes described herein, it is appreciated that one or more inlets, pathways, mixers, filters, outlets, pumps, valves, coolers, energy sources, flow sensors, or controllers (comprising a microprocessor and a memory), or the like may be included in any of the components, vessels, systems, and processes described herein for facilitating the introduction, introduction, output, timing, volume, selection, and direction of flows of any of the materials therein. In addition, instructions stored on a computer readable media may be provided to assist in carrying out any function described herein in an automated fashion. Moreover, the skilled artisan would understand or be able to modify the concentrations, volumes, flow rates, and other parameters necessary to achieve the desired result(s).

The function and advantages of these and other embodiments of the present invention will be more fully understood from the following examples. These examples are intended to be illustrative in nature and are not considered to be limiting the scope of the invention.

EXAMPLES

Example 1: Simulated Spent Caustic Treatment without Dilution

First, it was determined by experimental data that with salt concentrations as low as 30 g/L, conventional activated sludge treatment was unable to meet a 50 mg/L dissolved organic carbon (DOC) requirement without dilution of the incoming feed stream. For comparison, the treatment of ethylene spent caustic wet air oxidation (WAO) effluent via a PACT® MBR process as described above was simulated. The effluent from this testing was filtered and analyzed for dissolved constituents. Table 1 illustrates results for the final phase of testing where an additional 5% (50 g/L) TDS, in the form of sodium sulfate ($Na_2SO_4$), was added to the WAO effluent to reach 10% by wt or 100 g/L. The data in Table 1 below clearly demonstrates that a TDS concentration <10% (<100 g/L) with the assistance of powdered activated carbon (PAC) met a 50 mg/L effluent DOC (dissolved organic carbon) requirement without any dilution.

TABLE 1

| Day | Effluent Dissolved Organic Carbon (DOC), mg/L | Total Dissolved Solids (g/L) |
|---|---|---|
| 1 | 17.2 | 73.7 |
| 3 | 15.7 | |
| 4 | 15.7 | |
| 8 | 16.3 | 77.7 |
| 11 | 15.4 | |
| 15 | 12.4 | 78.9 |
| 17 | 15.7 | 93.1 |
| 18 | 15.6 | |
| 22 | 15.2 | |
| 24 | 20.9 | |
| 25 | 21.5 | 98.4 |
| 28 | 16.4 | |
| 29 | 16 | |
| 31 | 15.4 | 103 |
| 32 | 16.5 | |
| 36 | 18 | 103 |
| 38 | 17.6 | 100* |
| 39 | 15.3 | 100* |
| 43 | 21.3 | 100* |
| 45 | 17.2 | 100* |
| 52 | 18.3 | 100* |
| 53 | 18.9 | 100* |
| 57 | 21.7 | 100* |

*= TDS values were calculated based on feed water concentration and $NA_2SO_4$ addition

Example 2: Spent Carbon Regeneration with WAO

A method for regenerating the carbon used in the treatment of spent caustic as described herein was examined. An amount of spent carbon equal to a daily carbon dose required for achieving effluent quality was delivered to a Wet Air Oxidation (WAO) unit and regenerated simultaneously with a 1-20% by wt (10-200 g/L) TDS ethylene spent caustic. The regenerated carbon was then flowed with the treated caustic stream back to the attached growth biological treatment process.

The data showed that spent carbon from biological treatment could be satisfactorily regenerated—even when combined with spent caustic. In fact, the data presented in Table 3 below illustrates significant regeneration up to 20% spent caustic.

TABLE 3

| Test Condition | Calculated x/m at 90% Abs Reduction | MRE (%) | % Caustic Oxidized in oxidized sample | MRE (compared to no Spent Caustic case) |
|---|---|---|---|---|
| HDH Carbon Standard | 0.0549 | | | |
| No Spent Caustic Added | 0.0644 | 117% | 0.00% | 100% |
| 1 part SC to 29 parts WAR | 0.0613 | 112% | 3.33% | 95% |
| 1 part SC to 19 parts WAR | 0.0608 | 111% | 5.00% | 94% |
| 1 part SC to 4 parts WAR | 0.0536 | 98% | 20% | 83% |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A treatment process for wastewater comprising a chemical oxygen demand (COD) concentration and a total dissolved solids (TDS) concentration of at least about 10 g/L therein, the process comprising:
    subjecting the wastewater to wet air oxidation to remove an amount of COD from the wastewater and generate a first treated stream comprising a first reduced COD concentration relative to the wastewater and the TDS concentration of at least about 10 g/L; and
    subjecting the first treated stream to a biological process comprising contacting the first treated stream with an amount of biomass and powdered activated carbon, to generate a second treated stream comprising at least a second reduced COD concentration relative to the first treated stream.

2. The treatment process of claim 1, wherein the TDS concentration in the first treated stream is from 10 g/L to 200 g/L.

3. The treatment process of claim 1, wherein at least 90% by weight of the TDS in the wastewater is conveyed to the second treated stream.

4. The treatment process of claim 1, further comprising removing at least a portion of the TDS concentration from the first treated stream by passing the first treated stream through a plurality of membranes.

5. The treatment process of claim 1, wherein the wastewater comprises a spent caustic.

6. A treatment system comprising:
    a source of wastewater comprising a chemical oxygen demand (COD) concentration and a total dissolved solids (TDS) concentration of at least 10 g/L therein;
    a wet air oxidation unit in fluid communication with the source and configured to remove an amount of COD from the wastewater to generate a first treated stream comprising a first reduced COD concentration relative to the wastewater and the TDS concentration of at least 10 g/L; and
    a bioreactor downstream from the wet air oxidation unit, the bioreactor comprising an amount of biomass and powdered activated carbon therein, and configured to remove further COD from the first treated stream to generate a second treated stream comprising at least a second reduced COD concentration relative to the first treated stream.

7. The system of claim 6, wherein the TDS concentration in the wastewater is from 10 g/L to 200 g/L.

8. The system of claim 6, further comprising a solid/liquid separator downstream from the bioreactor, the solid/liquid separator configured to separate solids from liquid in the second treated stream and reduce an amount of a TDS concentration in the second treated stream.

9. The system of claim 6, wherein the bioreactor further comprises a plurality of membranes therein.

10. The system of claim 6, wherein the wastewater comprises a spent caustic.

11. A treatment process for wastewater comprising a chemical oxygen demand (COD) concentration and a total dissolved solids (TDS) concentration therein, the process comprising:
    directing the wastewater to a wet air oxidation unit for oxidation of oxidizable contaminants therein, thereby producing a first treated stream comprising a first reduced COD concentration and the TDS concentration;
    diluting the first treated stream with a dilution fluid generated from a brine concentration process, wherein the dilution fluid from the brine concentration process comprises a lower TDS concentration relative to the first treated stream, thereby producing a diluted first treated stream with a reduced TDS concentration relative to the wastewater; and directing the diluted first treated stream to a biological treatment process, wherein the biological treatment process comprises contacting the wastewater with an amount of a biological material and an activated carbon material to generate a second treated stream comprising a second reduced COD concentration with the reduced TDS concentration.

12. The process of claim 11, wherein the TDS concentration in the wastewater is from 10 to 200 g/L.

13. The process of claim 11, wherein the biological treatment process further comprises contacting the wastewater with one or more membranes.

14. The process of claim 11, wherein the brine concentration process comprises a reverse osmosis process, and wherein the dilution fluid comprises a permeate from the reverse osmosis process having a lower TDS concentration relative to the first treated stream.

15. The process of claim 11, wherein the dilution fluid is provided via:

directing the second treated stream from the biological treatment process to a brine concentration process; and separating the second treated stream into a TDS concentrate and the dilution fluid.

16. The process of claim 15, further comprising:

combining the second treated stream from the biological treatment process with an amount of a TDS concentrate from the brine concentration process; and directing the combined stream to the brine concentration process to reproduce the dilution fluid and the TDS concentrate.

17. A treatment system for wastewater comprising a chemical oxygen demand (COD) concentration and a total dissolved solids (TDS) concentration therein, the system comprising:

a source of the wastewater;

a wet air oxidation unit in fluid communication with the source configured to oxidize oxidizable contaminants therein to produce a first treated stream comprising a first reduced COD concentration relative to the wastewater and the TDS concentration;

a bioreactor in fluid communication with the wet air oxidation unit via a fluid line, the bioreactor comprising a biomass and powdered activated carbon therein and configured to generate a second treated stream comprising a second reduced COD concentration relative to the first treated stream; and a brine concentrator in fluid communication with the bioreactor and the fluid line, the brine concentrator configured to generate a dilution fluid having a lower TDS concentration relative to the first treated stream, the brine concentrator further configured to deliver the dilution fluid generated by the brine concentrator to the fluid line between the wet air oxidation unit and the bioreactor to produce a diluted first treated stream.

18. The system of claim 17, wherein the TDS concentration in the wastewater is from 10 g/L to 200 g/L.

19. The system of claim 17, wherein the bioreactor further comprises one or more membranes therein.

20. The system of claim 17, further comprising:

a vessel configured to receive and combine the second treated stream from the bioreactor and a TDS concentrate from the brine concentrator to generate a combined fluid;

wherein the vessel is in fluid communication with the brine concentrator and configured to deliver the combined fluid to the brine concentrator, the brine concentrator configured to generate the dilution fluid and a TDS concentrate from the combined fluid.

* * * * *